(12) United States Patent
Murakami

(10) Patent No.: US 11,415,439 B2
(45) Date of Patent: Aug. 16, 2022

(54) APPARATUS AND METHOD FOR ESTIMATING FLOW VELOCITY OF FLUID

(71) Applicant: DENSO WAVE INCORPORATED, Aichi-pref. (JP)

(72) Inventor: Yotaro Murakami, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 255 days.

(21) Appl. No.: 16/197,897

(22) Filed: Nov. 21, 2018

(65) Prior Publication Data
US 2019/0212175 A1 Jul. 11, 2019

(30) Foreign Application Priority Data
Nov. 24, 2017 (JP) .............................. JP2017-225912

(51) Int. Cl.
*G01F 1/36* (2006.01)
*G01F 1/34* (2006.01)
*G01F 15/063* (2022.01)
*G01F 15/00* (2006.01)

(52) U.S. Cl.
CPC ................ *G01F 1/34* (2013.01); *G01F 1/363* (2013.01); *G01F 15/005* (2013.01); *G01F 15/063* (2013.01)

(58) Field of Classification Search
CPC ....................................................... G01F 1/34
USPC ........................................................ 73/199
See application file for complete search history.

(56) References Cited

U.S. PATENT DOCUMENTS

| 2005/0103093 A1* | 5/2005 | Williams | .............. | G01F 1/74 |
| | | | | 73/19.05 |
| 2017/0328151 A1* | 11/2017 | Dillard | .............. | E21B 21/106 |

FOREIGN PATENT DOCUMENTS

| JP | 3793477 B2 | 7/2006 |
| JP | 4864135 B2 | 2/2012 |
| JP | 5163574 B2 | 3/2013 |

* cited by examiner

*Primary Examiner* — Walter L Lindsay, Jr.
*Assistant Examiner* — Philipmarcus T Fadul
(74) *Attorney, Agent, or Firm* — Oliff PLC

(57) ABSTRACT

An apparatus includes a solenoid valve and a pressure sensor disposed in a water pipe in this order from an upstream end, and a control unit controlling open/close of the solenoid valve and receives a sensor signal outputted from the pressure sensor. The controller obtains a difference between a water pressure measured by the pressure sensor when it is determined that the decreased degree of opening is increased, and a water pressure measured by the pressure sensor when a flow velocity is zero, and calculates a loss coefficient of an upstream water pipe located upstream from the solenoid valve based on the pressure difference and a flow velocity calculated based on a loss coefficient of the solenoid valve. The controller estimates a flow velocity of the water currently flowing in the water pipe based on the loss coefficient and the difference between water pressures of the last and present measurements.

5 Claims, 4 Drawing Sheets

APPARATUS AND METHOD FOR ESTIMATING FLOW VELOCITY OF FLUID

CROSS-REFERENCE TO RELATED APPLICATION

This application is based on and claims the benefit of priority from earlier Japanese Patent Application No. 2017-225912 filed Nov. 24, 2017, the descriptions of which are incorporated herein by reference.

BACKGROUND OF THE INVENTION

Technical Field

The present invention relates to apparatuses and methods for estimating a flow velocity of a fluid (such as water) in a fluid channel such as a water pipe.

Related Art

Various techniques for detecting water leaks in water pipes have been proposed. From the viewpoint of prevention of waste of water and damage to houses and the like, it is desired to detect very small water leaks and take measures at an early stage.

In order to detect water leaks, it has been proposed, for example, to close a solenoid valve disposed in a water pipe and monitor whether the water pressure downstream from the solenoid valve has decreased or not when a predetermined time has elapsed. However, this technique requires the water pipe to be closed by the solenoid valve for a predetermined period of time, which limits the period for detection. Therefore, it is desired to detect water leaks by continuously monitoring changes in flow velocity of water without closing the water pipe. The related arts are disclosed, for example, in Japanese Patent Nos. 3793477, 5163574, and 4864135.

PRIOR ART REFERENCE

Parent Literature

[PTL 1] JP-B 3793477
[PTL 2] JP-B 5163574
[PTL 3] JP-B 4864135

In the aforementioned related arts, however, a plurality of pressure gauges are used (Japanese Patent No. 3793477), a pressure sensor and a flow meter are used (Japanese Patent No. 5163574), and a pressurizing device such as a pump is used (Japanese Patent No. 4864135).

SUMMARY

It is thus desired to provide a flow velocity estimation apparatus and a flow velocity estimation method that can continuously estimate (calculate, evaluate) a flow velocity of a fluid such as water in a fluid channel such as a water pipe with a simpler configuration.

According to a typical aspect of the present disclosure, an estimation apparatus includes: a solenoid valve disposed in a water pipe and configured to open and close to thereby control a flow of water flowing in the water pipe; a pressure sensor disposed downstream from the solenoid valve in the water pipe and configured to detect a pressure of the water; and a control unit that controls open and closed states of the solenoid valve and receives a sensor signal indicative of the pressure outputted from the pressure sensor, and an estimation method applied to the above configuration are provided.

The control unit calculates a flow velocity $v_r$ based on a loss coefficient $\zeta_v$ of the solenoid valve obtained in advance, and the difference between a water pressure P0 measured by the pressure sensor in advance when the flow velocity is zero and a water pressure P1 measured by the pressure sensor when opening of the solenoid valve is decreased to a predetermined degree.

Further, the control unit obtains a difference $\Delta P_p$ between a water pressure P2 measured by the pressure sensor when the decreased degree of opening of the solenoid valve is increased, and the water pressure P0, and calculates a loss coefficient $\zeta_p$ of an upstream water pipe located upstream from the solenoid valve based on the pressure difference $\Delta P_p$ and the flow velocity $v_r$. The control unit estimates a flow velocity v of the water currently flowing in the water pipe based on the loss coefficient $\zeta_p$ and the difference between a water pressure of a last measurement and a water pressure of a present measurement.

The relationship between the flow velocity v of water and a pressure loss $\Delta P$ is represented by the following equation by using a loss coefficient $\zeta$ and a density of water $\rho$.

$$\Delta P = (\zeta \rho v^2)/2 \tag{1}$$

The loss coefficient $\zeta_v$ of the solenoid valve can be obtained in advance by measuring the flow velocity v of water and the pressure loss $\Delta P$ with the valve being set at a predetermined degree of opening.

Further, in order to obtain the loss coefficient $\zeta_p$ of the upstream water pipe, it is necessary to obtain the flow velocity $v_r$. The flow velocity $v_r$ is calculated according to the following equation based on a difference $\Delta p_v$ between the water pressure P0 measured by the pressure sensor in advance when the flow velocity is zero and the water pressure P1 measured by the pressure sensor when opening of the solenoid valve is decreased to a predetermined degree of opening.

$$v_r = \sqrt{\{2\Delta P_v/(\rho \zeta_v)\}} \tag{2}$$

$$\zeta_p = 2\Delta P_p/(\rho v_r^2) \tag{3}$$

The difference $\Delta P_p$ between the water pressure P2 measured by the pressure sensor when the decreased degree of opening is increased, and the water pressure P0 is obtained. Accordingly the loss coefficient $\zeta_p$ of the upstream water pipe located upstream from the solenoid valve is calculated based on the pressure difference $\Delta P_p$ and the flow velocity $v_r$.

$$\zeta_p = 2\Delta P_p/(\rho v_r^2) \tag{3}$$

As described above, by obtaining the loss coefficient $\zeta_p$ in advance, the control unit can estimate the flow velocity v of the water currently flowing by the following equation based on a pressure difference $\Delta P$ which is obtained when a significant difference occurs in the pressure inside the water pipe, even in a time zone when the water supply is actually in use.

$$v = \sqrt{\{2\Delta P/(\rho \zeta_p)\}} \tag{4}$$

That is, in actual operation, by simply providing the solenoid valve and the pressure sensor in the water pipe, the flow velocity v can be determined at any time during use of water supply without closing the water pipe by the solenoid valve.

The estimation scheme of the above estimation apparatus for a water pipe may be configured as follows as a more generalized estimation apparatus. That is, an apparatus includes: a solenoid valve disposed in a fluid channel and configured to open and close to thereby control a flow of a fluid flowing in the fluid channel; a pressure sensor disposed downstream from the solenoid valve in the fluid channel and configured to detect a pressure of the fluid; and a control unit that controls open and closed states of the solenoid valve and receives a sensor signal indicative of the pressure outputted from the pressure sensor. The control unit calculates a flow velocity $v_r$ based on a loss coefficient $\zeta_v$ of the solenoid valve obtained in advance, and a difference between a fluid pressure P0 measured by the pressure sensor in advance when a flow velocity is zero and a fluid pressure P1 measured by the pressure sensor when opening of the solenoid valve is decreased to a predetermined degree of opening, determines whether the decreased degree of opening of the solenoid valve is increased or not, obtains a difference $\Delta P_p$ between a fluid pressure P2 measured by the pressure sensor when it is determined that the decreased degree of opening is increased, and the fluid pressure P0, calculates a loss coefficient $\zeta_p$ of an upstream fluid channel located upstream from the solenoid valve based on the pressure difference $\Delta P_p$ and the flow velocity $v_r$, and estimates a flow velocity v of the fluid currently flowing in the fluid channel based on the loss coefficient $\zeta_p$ and the difference between a fluid pressure of a last measurement and a fluid pressure of a present measurement. With this configuration as well, the same effect as that of the flow velocity estimation of water in the water pipe can be obtained.

According to a further modification, the control unit obtains a variance for a water pressure measured by the pressure sensor; and estimates the flow velocity when a value of the variance exceeds a specified value. Accordingly, the flow velocity v can be calculated when the water pressure difference becomes significant.

DETAILED DESCRIPTION OF THE PREFERRED EMBODIMENTS

With reference to the drawings, an embodiment will now be described.

Figure 1A:
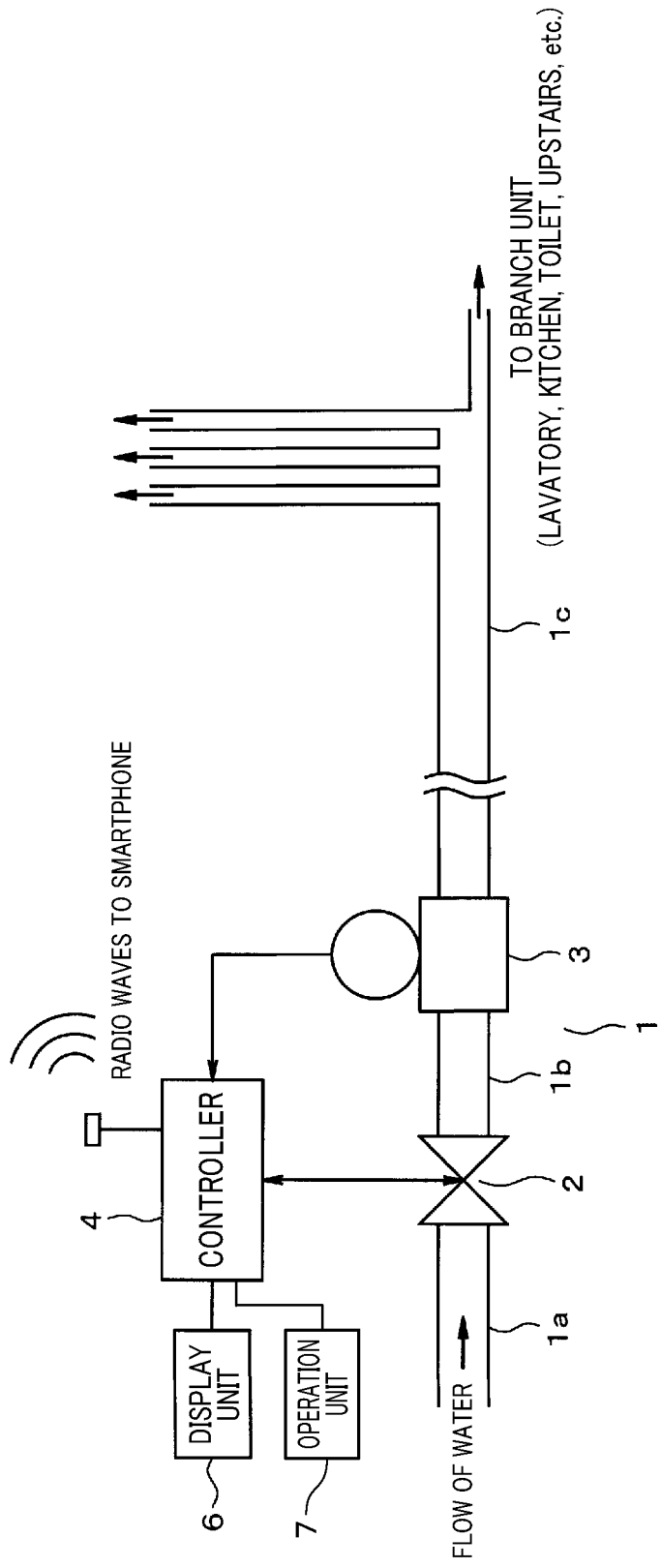
FIG. 1A is a functional block diagram showing a configuration of a flow velocity estimation apparatus according to an embodiment.
Figure 1B:
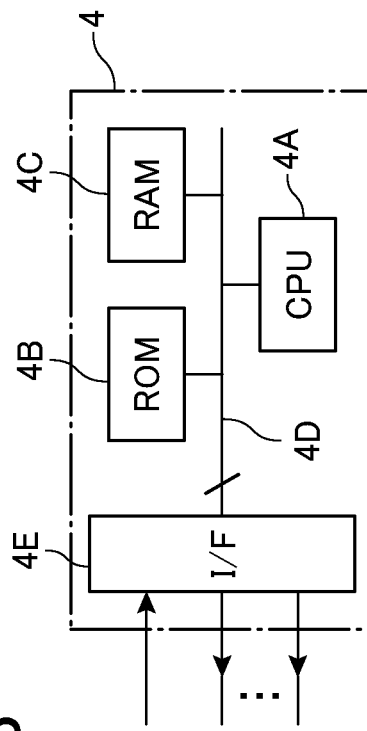
FIG. 1B is a block diagram showing an exemplary configuration of a controller installed in the flow velocity estimation apparatus.

FIG. 1A is a functional block diagram showing a configuration of a flow velocity estimation apparatus. A water pipe 1 is a pipe for supplying water to a general household, for example, and has a solenoid valve 2 and a pressure sensor 3 disposed in the middle of the water pipe 1. Hereinafter, a portion of the water pipe upstream from the solenoid valve 2, that is, on a side close to a water source, is referred to as an upstream water pipe 1a; a portion between the solenoid valve 2 and the pressure sensor 3 is referred to as an intermediate water pipe 1b; and a portion downstream from the pressure sensor 3, that is, on a side close to a household, is referred to as a downstream water pipe 1c. The end of the downstream water pipe 1c is branched into a plurality of pipes in order to supply water to each area in a household such as a washroom, kitchen, and bathroom. When the water supply is not in use, the distal end portion of the downstream water pipe 1c is closed by a water feed valve such as a faucet, which is not shown.

The water pipe 1 functions as a fluid channel (or flow channel), and water flowing in the water pipe 1 is an example of a fluid.

The solenoid valve 2 switches the water pipe 1 between a fully closed state and a fully open state, and the open/close control is performed by a controller 4 (control unit). The controller 4 is configured of, for example, a microcomputer and the like. A sensor signal outputted from the pressure sensor 3 is transmitted to the controller 4. Further, a display 6 is connected to the controller 4. The display 6 is installed, for example, on a wall surface in a house, and displays the status information and the like of the water pipe 1 obtained by the controller 4 as a symbol or a text message.

The controller 4 includes circuit elements such as a central processing unit (CPU) 4A, a read only memory (ROM) 4B, and a RAM (random access memory) 4C, which are required for calculation. These elements are communicably connected to each other via an internal bus 4D, and connected to the display 6, an operation unit 7, and a wireless communication system for communication with the outside via an interface 4E. The controller 4 itself may have a known configuration.

The ROM 4B pre-stores programs, fixed data, and the like required for flow velocity estimation. The RAM 4B temporarily stores information and parameters required to execute these programs. As the CPU 4A executes programs stored in the ROM 4B, the controller 4 can provide a functional configuration required for calculation of flow velocity estimation. Specifically, as can be seen from the detailed description described below, the controller 4 provides:

a function of calculating a flow velocity $v_r$ based on a loss coefficient $\zeta_v$ of the solenoid valve 2 obtained in advance, and a difference between a water pressure P0 measured by the pressure sensor 3 in advance when a flow velocity is zero and a water pressure P1 measured by the pressure sensor 3 when opening of the solenoid valve 2 is decreased to a predetermined degree of opening;

a function of determining whether the decreased degree of opening of the solenoid valve is increased or not;

a function of obtaining a difference $\Delta P_p$ between a water pressure P2 measured by the pressure sensor when it is determined that the decreased degree of opening is increased, and the water pressure P0;

a function of calculating a loss coefficient $\zeta_p$ of an upstream water pipe located upstream from the solenoid valve based on the pressure difference $\Delta P_p$ and the flow velocity $v_r$; and a function of estimating a flow velocity v of the water currently flowing in the water pipe based on the loss coefficient $\zeta_p$ and the difference between a water pressure of a last measurement and a water pressure of a present measurement.

Further, the controller 4 has a wireless communication function, and transmits the information displayed on the display 6, for example, to a smartphone possessed by a user to notify the user. Only either the display 6 or the information notification function by wireless communication may be provided. A drive power for each of these components may be a battery or may be generated by a power supply circuit connected to a commercial AC power supply. In the configuration described above, the solenoid valve 2, the pressure sensor 3, and the controller 4 correspond to a flow velocity estimation apparatus.

Figure 2:
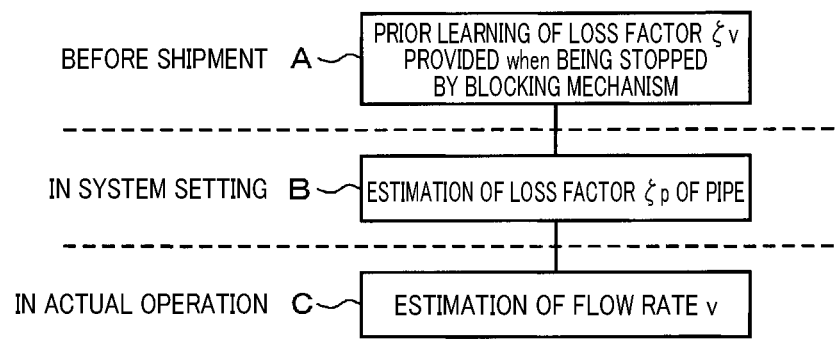
FIG. 2 is a flowchart depicting a procedure before the flow velocity estimation apparatus is actually operated.

An effect of the present embodiment will now be described. FIG. 2 is a flowchart depicting a procedure before the flow velocity estimation apparatus is actually operated.

Procedure A

Before shipment of the flow velocity estimation apparatus, a loss coefficient $\zeta_v$ of the solenoid valve 2 is obtained in advance.

Procedure B

In installation of the flow velocity estimation apparatus in the water pipe 1, a loss coefficient $\zeta_p$ of the upstream water pipe 1a of the water pipe 1 is obtained in advance.

Procedure C

In actual operation of the flow velocity estimation apparatus, a flow velocity v of water in the water pipe 1 is estimated.

Each of the procedures will be sequentially described below.

Figure 3:
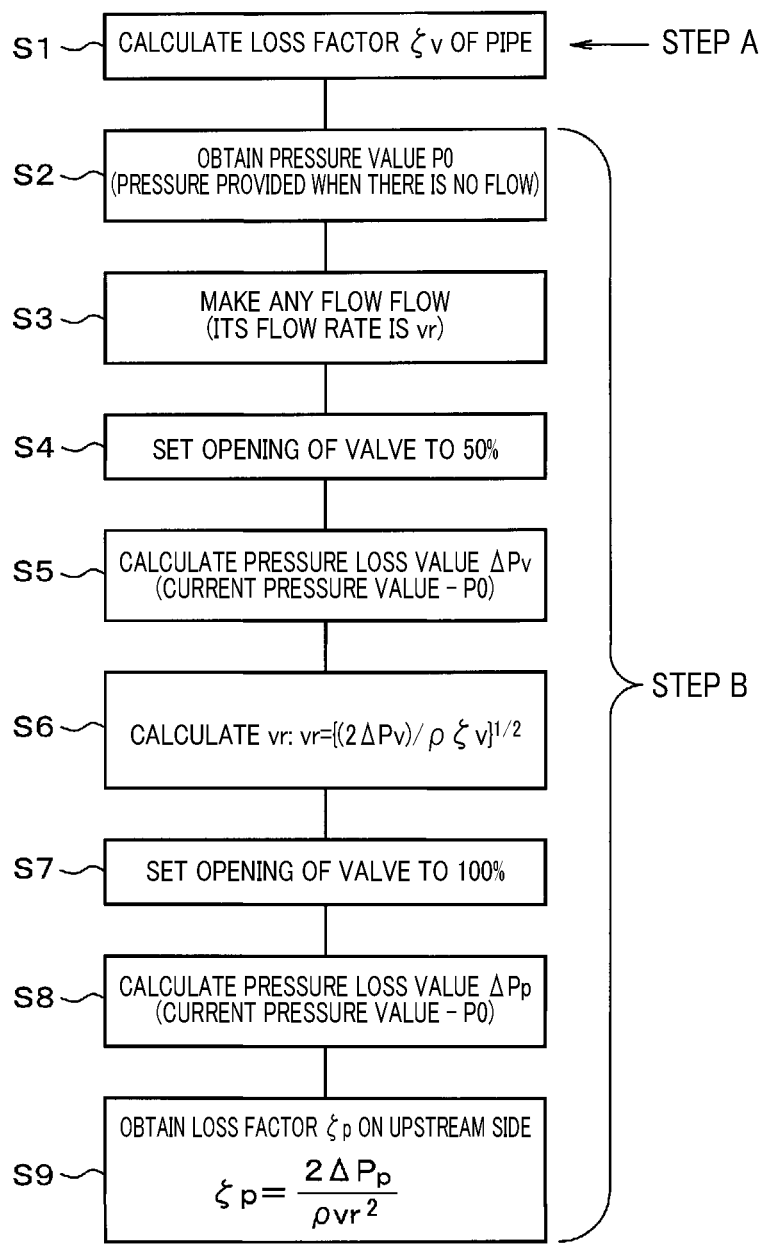
FIG. 3 is a flowchart depicting a process corresponding to procedures A and B.

FIG. 3 is a flowchart corresponding to the procedures A and B, and mainly depicts a process performed by the controller 4 (in this embodiment, CPU 4A). This process is performed interactively with the user as necessary.

First, the loss coefficient $\zeta_v$ of the solenoid valve 2 (in the figure, referred to as the "valve") is obtained before shipment (S1, procedure A). The loss coefficient $\zeta_v$ is obtained from the difference in water pressure generated when the degree of opening of the solenoid valve 2 is decreased, for example, from a fully open state to a predetermined degree of opening (for example 50%), that is, a pressure loss $\Delta P_{v0}$ and the flow velocity $v_v$ based on the equation (1) described above.

$$\zeta_v = 2\Delta P_{v0}/(\rho v_v^2) \tag{5}$$

The subsequent steps S2 to S9 correspond to the procedure B. First, the solenoid valve 2 is fully closed to obtain a water pressure P0 in the state where the flow velocity is zero (S2). Then, the solenoid valve 2 is fully opened to 100% open, and the faucet is opened to allow water to flow (S3). Then, the solenoid valve 2 is set to 50% open as with the case of step S1 (S4). A water pressure P1 at this time is measured to calculate a pressure loss $\Delta P_v$ (=P1−P0) (S5). Then, a flow velocity $v_r$ at this time is calculated by the following equation (2) (S6).

$$v_r = \sqrt{\{2\Delta P_v/(\rho\zeta_v)\}} \tag{2}$$

Subsequently, the solenoid valve 2 is again fully opened (S7), and a water pressure P2 at this time is measured to calculate a pressure loss $\Delta P_p$ (=P2−P0) (S8). Then, a loss coefficient $\zeta_p$ of the upstream water pipe 1a is calculated by the following equation (3) (S9).

$$\zeta_p = 2\Delta P_p/(\rho v_r^2) \tag{3}$$

The procedure B ends here.

Figure 4:
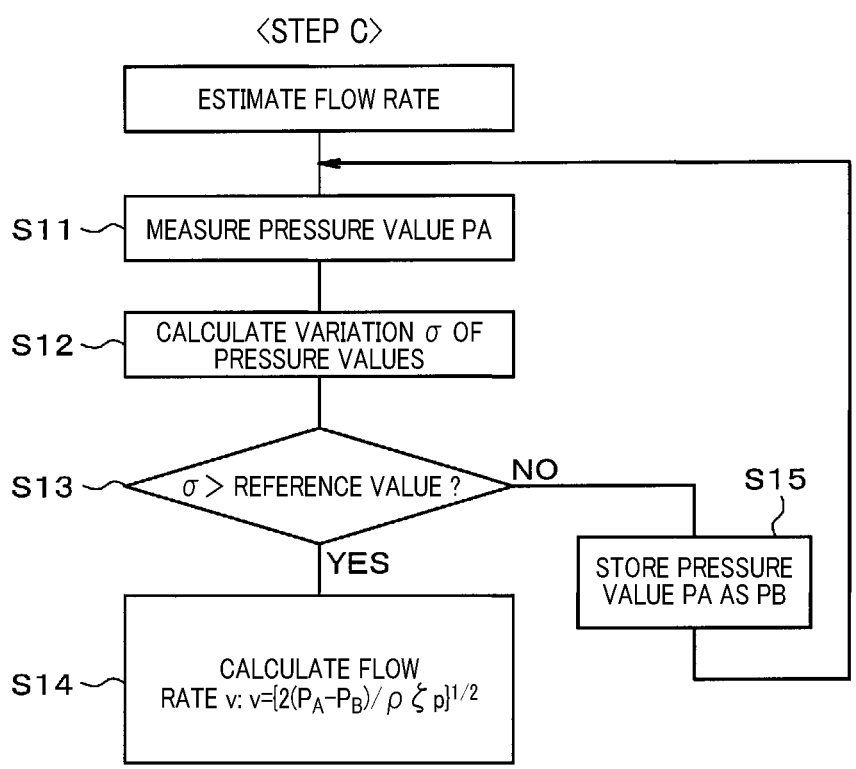
FIG. 4 is a flowchart depicting a process corresponding to a procedure C.

FIG. 4 is a flowchart corresponding to the procedure C. A pressure PA is measured in a predetermined cycle, for example, on the order of 10 ms (S11), and distribution of the measurements, a variance σ, of the pressure PA obtained in a predetermined period of time is calculated (S12). Then, whether the value of the variance σ exceeds a specified value or not is determined (S13). If the value of the variance σ is not more than the specified value (No in S13), the value of the pressure PA is stored as PB (S15). Then, the process returns to step S11. If the value of the variance a exceeds the threshold value (Yes in S13), the flow velocity v is calculated (S14).

$$v = \sqrt{\{2(PA-PB)/(\rho\zeta_p)\}} \tag{6}$$

Thus, the controller 4 can estimate the flow velocity v at any time without closing the water pipe 1 by the solenoid valve 2 during a time zone when the water supply is in use. Accordingly, by monitoring the flow velocity v, it is estimated that a water leak has occurred, for example, when the flow velocity v becomes the threshold value or more for a predetermined period of time. In this case, for example, a warning message to that effect can be displayed on the display 6, or a similar message can be transmitted and notified to a smartphone or the like possessed by the user.

As described above, according to the present embodiment, the solenoid valve 2 is disposed in the water pipe 1, in which a water feed valve is provided in the downstream water pipe 1c, and the pressure sensor 3 is disposed at a position downstream from the solenoid valve 2. The controller 4 calculates the flow velocity $v_r$ based on the loss coefficient $\zeta_v$ of the solenoid valve 2 obtained in advance, and the difference between the water pressure P0 measured by the pressure sensor 3 in advance when the flow velocity is zero and the water pressure P1 measured by the pressure sensor 3 when the opening of the solenoid valve 2 is decreased to a predetermined degree of opening.

Further, the controller 4 obtains the difference $\Delta P_p$ between the water pressure P2 measured by the pressure sensor 3 when the decreased degree of opening of the solenoid valve 2 is increased and the water pressure P0, and calculates the loss coefficient $\zeta_p$ of the upstream water pipe 1a located upstream from the solenoid valve 2 based on the pressure difference $\Delta P_p$ and the flow velocity $v_r$. Then, the flow velocity v of water currently flowing in the water pipe is estimated based on the loss coefficient $\zeta_p$ and the difference between the water pressure PB of the last measurement and the water pressure PA of the present measurement. That is, in actual operation, by simply providing the solenoid valve 2 and the pressure sensor 3 in the water pipe 1, the flow velocity v can be determined at any time during use of water supply without closing the water pipe 1 by the solenoid valve 2.

Further, the controller 3 obtains the variance a for the water pressure PA measured by the pressure sensor 3, and estimates the flow velocity v when the value of the variance σ exceeds a specified value. Accordingly, the flow velocity v can be calculated when the water pressure difference becomes significant.

The present invention is not limited to the embodiments described above or shown in the drawings, and the following modifications or extensions are possible.

The degree of opening of the solenoid valve 2 may be set as appropriate. However, the degrees of opening in steps S1 and S4 need to be set to an equal value.

Instead of obtaining the variance σ for the pressure value PA, for example, the difference between PA and PB may be obtained each time by using the measurement in the last cycle as PB so that the flow velocity v can be calculated when the difference becomes a predetermined value or more.

Furthermore, the estimation apparatus and the estimation method according to the present invention may be applied not only to water pipes but also to fluid supply systems for a fluid channel connecting an upstream fluid source and a downstream supply valve, in which a solenoid valve and a pressure sensor are disposed in this order from the upstream fluid channel, to estimate a flow velocity of a fluid flowing in the fluid channel by the controller 4 (control unit) having the same configuration as that described above. An example of such fluid supply systems is a system for supplying various liquids and fuels in factories. In this case, the water pressure in the aforementioned estimation calculation shall be replaced with a fluid pressure. With this configuration as well, the flow velocity of the fluid in the fluid supply system can be accurately estimated, and the estimation result can be effectively used for maintenance and the like.

What is claimed is:

1. An apparatus that estimates a flow velocity of water flowing in a water pipe, the apparatus comprising:
    a solenoid valve disposed in the water pipe and configured to open and close to thereby control a flow of the water flowing in the water pipe;
    a single pressure sensor disposed downstream from the solenoid valve in the water pipe and configured to detect a pressure of the water and output a sensor signal that indicates detected pressure; and
    a control unit having a processor configured to control open and closed states of the solenoid valve and receive the sensor signal from the single pressure sensor, the processor being configured to implement steps of:
        calculating a flow velocity $v_r$ based on a i) loss coefficient $\zeta_v$ of the solenoid valve obtained in advance, and ii) a difference between a water pressure P0 measured by the single pressure sensor in advance when a flow velocity is zero and a water pressure P1 measured by the single pressure sensor when opening of the solenoid valve is set to a predetermined degree of opening,
        determining whether the degree of opening of the solenoid valve is increased or not,
        obtaining a difference $\Delta P_p$ between a water pressure P2 measured by the single pressure sensor when it is determined that the degree of opening is increased, and the water pressure P0,
        calculating a loss coefficient $\zeta_p$ of an upstream water pipe located upstream from the solenoid valve based on the pressure difference $\Delta P_p$ and the flow velocity $v_r$, and
        estimating a flow velocity v of the water currently flowing in the water pipe based on the loss coefficient $\zeta_p$ and the difference between a water pressure of a last measurement and a water pressure of a present measurement.

2. The apparatus for estimating a flow velocity according to claim 1, wherein the processor is configured to implement further steps of obtaining a variance for a water pressure measured by the single pressure sensor, determining whether a value of the variance exceeds a specified value or not, and estimating the flow velocity when it is determined that the value of the variance exceeds the specified value.

3. A method for estimating a flow velocity of water flowing in a water pipe, the method comprising:
    calculating a flow velocity $v_r$ of water flowing in the water pipe based on a loss coefficient $\zeta_v$ of a solenoid valve disposed in the water pipe, in which water flows, at a position upstream from a water feed valve which is disposed in the water pipe, and a difference between a water pressure P0 measured by a single pressure sensor in advance when a flow velocity is zero, the single pressure sensor being disposed at a position downstream from the solenoid valve in the water pipe, and a water pressure P1 measured by the single pressure sensor when opening of the solenoid valve is set to a predetermined degree of opening;
    determining whether the degree of opening of the solenoid valve is increased or not;
    obtaining a difference $\Delta P_p$ between a water pressure P2 measured by the single pressure sensor when it is determined that the degree of opening is increased, and the water pressure P0;
    calculating a loss coefficient $\zeta_p$ of an upstream water pipe located upstream from the solenoid valve based on the pressure difference $\Delta P_p$ and the flow velocity $v_r$; and
    estimating a flow velocity v of the water currently flowing in the water pipe based on the loss coefficient $\zeta_p$ and the difference between a water pressure of a last measurement and a water pressure of a present measurement.

4. The method for estimating a flow velocity according to claim 3, the method comprising:
    obtaining a variance for a water pressure measured by the single pressure sensor; and
    estimating the flow velocity when it is determined that a value of the variance exceeds a specified value.

5. An apparatus that estimates a flow velocity of a fluid flowing in a fluid channel, the apparatus comprising:
    a solenoid valve disposed in the fluid channel and configured to open and close to thereby control a flow of the fluid flowing in the fluid channel;
    a single pressure sensor disposed downstream from the solenoid valve in the fluid channel and configured to detect a pressure of the fluid and output a sensor signal that indicates detected pressure; and
    a control unit having a processor configured to control open and closed states of the solenoid valve and receive the sensor signal from the single pressure sensor, the processor being configured to implement steps of:
        calculate a flow velocity $v_r$ based on i) a loss coefficient $\zeta_v$ of the solenoid valve obtained in advance, and ii) a difference between a fluid pressure P0 measured by the single pressure sensor in advance when a flow velocity is zero and a fluid pressure P1 measured by the single pressure sensor when opening of the solenoid valve is set to a predetermined degree of opening,
        determine whether the degree of opening of the solenoid valve is increased or not,
        obtain a difference $\Delta P_p$ between a fluid pressure P2 measured by the single pressure sensor when it is determined that the degree of opening is increased, and the fluid pressure P0,
        calculate a loss coefficient $\zeta_p$ of an upstream fluid channel located upstream from the solenoid valve based on the pressure difference $\Delta P_p$ and the flow velocity $v_r$, and
        estimate a flow velocity v of the fluid currently flowing in the fluid channel based on the loss coefficient $\zeta_p$ and the difference between a fluid pressure of a last measurement and a fluid pressure of a present measurement.

* * * * *